United States Patent
Browne et al.

(10) Patent No.: US 7,140,081 B2
(45) Date of Patent: Nov. 28, 2006

(54) RELEASABLE FASTENER SYSTEM

(75) Inventors: Alan Lampe Browne, Grosse Pointe, MI (US); Nancy L. Johnson, Northville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/358,997

(22) Filed: Feb. 5, 2003

(65) Prior Publication Data

US 2004/0074068 A1    Apr. 22, 2004

Related U.S. Application Data

(63) Continuation-in-part of application No. 10/273,691, filed on Oct. 19, 2002.

(51) Int. Cl.
    *A44B 18/00*    (2006.01)

(52) U.S. Cl. .................................................. 24/442

(58) Field of Classification Search .................. 24/442, 24/306, 304, 446, 448, 450, 451, 452; 428/100
    See application file for complete search history.

(56) References Cited

U.S. PATENT DOCUMENTS

| | | | |
|---|---|---|---|
| 2,717,437 A * | 9/1955 | De Mestral ................ 428/92 |
| 2,994,117 A * | 8/1961 | McMullin .................. 24/201 |
| 3,101,517 A | 8/1963 | Fox et al. .................. 24/442 |
| 3,128,514 A | 4/1964 | Parker et al. ............ 24/11 HC |
| 3,138,749 A | 6/1964 | Slibitz ...................... 318/135 |
| 3,176,364 A | 4/1965 | Dritz ........................ 24/306 |
| 3,292,019 A | 12/1966 | Hsu et al. ................ 310/328 |
| 3,365,757 A | 1/1968 | Billarant ................... 24/442 |
| 3,469,289 A * | 9/1969 | Whitacre ................... 24/450 |
| 3,490,107 A * | 1/1970 | Brumlik .................... 24/451 |
| 3,550,311 A * | 12/1970 | Fouquart ................... 446/102 |
| 3,808,648 A | 5/1974 | Billarant et al. ............ 24/450 |
| 4,169,303 A | 10/1979 | Lemelson .................. 24/452 |
| 4,382,243 A | 5/1983 | Babitzka et al. ............ 335/219 |
| 4,391,147 A | 7/1983 | Krempl et al. .............. 73/730 |
| 4,634,636 A | 1/1987 | Yoshino et al. ............ 428/500 |
| 4,637,944 A | 1/1987 | Walker ..................... 428/35 |
| 4,642,254 A | 2/1987 | Walker ..................... 428/36 |
| 4,693,921 A | 9/1987 | Billarant et al. ............ 428/100 |
| 4,752,537 A | 6/1988 | Das .......................... 428/614 |
| 4,775,310 A | 10/1988 | Fischer .................... 425/308 |
| 4,794,028 A | 12/1988 | Fischer .................... 428/100 |
| 4,931,344 A | 6/1990 | Ogawa et al. ............. 428/100 |
| 5,037,178 A | 8/1991 | Stoy et al. ................. 385/53 |

(Continued)

FOREIGN PATENT DOCUMENTS

DE    199 56 011    6/2001

(Continued)

*Primary Examiner*—Jack W. Lavinder
(74) *Attorney, Agent, or Firm*—Kathryn A. Marra

(57) ABSTRACT

A releasable fastener system comprises a loop portion and a hook portion. The loop portion includes a support and a loop material disposed on one side thereof whereas the hook portion includes a support and a plurality of closely spaced upstanding hook elements extending from one side thereof. When the hook portion and loop portion are pressed together they interlock to form a releasable engagement. The resulting joint created by the engagement is relatively resistant to shear and pull forces and weak in peel strength forces. The hook elements are formed of a material or have configurations that provide a shape changing capability and/or change in flexural modulus property to the hook elements. In this manner, the shape and/or flexural modulus of the hook elements can be remotely changed to provide a reduction in the shear and/or pull forces.

21 Claims, 3 Drawing Sheets

U.S. PATENT DOCUMENTS

| | | | |
|---|---|---|---|
| 5,071,363 A | 12/1991 | Reylek et al. | 439/291 |
| 5,133,112 A | 7/1992 | Gomez-Acevedo | 24/450 |
| 5,136,201 A | 8/1992 | Culp | 310/328 |
| 5,182,484 A | 1/1993 | Culp | 310/328 |
| 5,191,166 A | 3/1993 | Smirlock et al. | 89/36.02 |
| 5,212,855 A * | 5/1993 | McGanty | 24/452 |
| 5,284,330 A | 2/1994 | Carlson et al. | 267/140.14 |
| 5,312,456 A | 5/1994 | Reed et al. | 24/442 |
| 5,319,257 A | 6/1994 | McIntyre | 310/328 |
| 5,328,337 A | 7/1994 | Kunta | 417/310 |
| 5,474,227 A | 12/1995 | Krengel et al. | 228/147 |
| 5,486,676 A | 1/1996 | Aleshin | 219/121.63 |
| 5,492,534 A * | 2/1996 | Athayde et al. | 604/141 |
| 5,497,861 A | 3/1996 | Brotz | 188/267 |
| 5,547,049 A | 8/1996 | Weiss et al. | 188/267 |
| 5,611,122 A | 3/1997 | Torigoe et al. | 24/442 |
| 5,656,351 A | 8/1997 | Donaruma | 428/100 |
| 5,657,516 A | 8/1997 | Berg et al. | 24/452 |
| 5,669,120 A | 9/1997 | Wessels et al. | 24/446 |
| 5,671,498 A | 9/1997 | Martin et al. | 15/244.3 |
| 5,712,524 A | 1/1998 | Suga | 310/328 |
| 5,725,928 A | 3/1998 | Kenney | 428/100 |
| 5,797,170 A * | 8/1998 | Akeno | 24/452 |
| 5,798,188 A | 8/1998 | Mukohyama et al. | 429/34 |
| 5,814,999 A | 9/1998 | Elie et al. | 324/662 |
| 5,816,587 A | 10/1998 | Stewart et al. | 280/5.516 |
| 5,817,380 A | 10/1998 | Tanaka | 428/100 |
| 5,885,652 A | 3/1999 | Abbott et al. | 427/163.2 |
| 5,945,193 A | 8/1999 | Pollard et al. | 428/100 |
| 5,969,518 A | 10/1999 | Merklein et al. | 324/173 |
| 5,974,856 A | 11/1999 | Elie et al. | 73/11.04 |
| 5,979,744 A | 11/1999 | Brigleb | 229/87.01 |
| 5,983,467 A | 11/1999 | Duffy | 24/442 |
| 6,029,783 A | 2/2000 | Wirthlin | 188/267.1 |
| 6,086,599 A | 7/2000 | Lee | 606/108 |
| 6,102,912 A | 8/2000 | Cazin et al. | 606/61 |
| 6,102,933 A | 8/2000 | Lee et al. | 606/209 |
| 6,129,970 A * | 10/2000 | Kenney et al. | 428/100 |
| 6,148,487 A | 11/2000 | Billarant | 24/442 |
| 6,156,842 A | 12/2000 | Hoenig et al. | 525/171 |
| 6,203,717 B1 | 3/2001 | Munoz et al. | 252/62.52 |
| 6,257,133 B1 | 7/2001 | Anderson | 100/162 B |
| 6,388,043 B1 | 5/2002 | Langer et al. | 528/80 |
| 6,454,923 B1 | 9/2002 | Dodgson et al. | 204/415 |
| 6,460,230 B1 | 10/2002 | Shimamura et al. | 24/452 |
| 6,502,290 B1 * | 1/2003 | Tseng | 28/161 |
| 6,544,245 B1 | 4/2003 | Neeb et al. | 24/442 |
| 6,546,602 B1 * | 4/2003 | Eipper et al. | 24/442 |
| 6,593,540 B1 | 7/2003 | Baker et al. | 219/121.63 |
| 6,598,274 B1 * | 7/2003 | Marmaropoulos | 24/451 |
| 6,605,795 B1 | 8/2003 | Arcella et al. | 219/121.63 |
| 6,628,542 B1 | 9/2003 | Hayashi et al. | 365/158 |
| 6,681,849 B1 | 1/2004 | Goodson | 166/66.5 |
| 6,740,094 B1 | 5/2004 | Maitland et al. | 606/108 |
| 6,742,227 B1 | 6/2004 | Ulicny et al. | 24/442 |
| 6,766,566 B1 | 7/2004 | Cheng et al. | 24/452 |
| 6,797,914 B1 | 9/2004 | Speranza et al. | 219/121.64 |
| 6,815,873 B1 | 11/2004 | Johnson et al. | 310/331 |
| 2002/0007884 A1 | 1/2002 | Schuster | 148/164 |
| 2002/0050045 A1 | 5/2002 | Chiodo | 29/426.5 |
| 2002/0062547 A1 | 5/2002 | Chiodo et al. | 29/426.5 |
| 2002/0076520 A1 | 6/2002 | Neeb et al. | 428/100 |
| 2002/0142119 A1 | 10/2002 | Seward et al. | 428/36.9 |
| 2003/0120300 A1 | 6/2003 | Porter | 606/191 |
| 2004/0025639 A1 | 2/2004 | Shahinpoor et al. | 75/722 |
| 2004/0033336 A1 | 2/2004 | Schulte | 428/100 |
| 2004/0074061 A1 | 4/2004 | Ottaviani et al. | 24/442 |
| 2004/0074062 A1 | 4/2004 | Stanford et al. | 24/442 |
| 2004/0074063 A1 | 4/2004 | Golden et al. | 24/442 |
| 2004/0074064 A1 | 4/2004 | Powell et al. | 24/442 |
| 2004/0074067 A1 | 4/2004 | Browne et al. | 24/442 |
| 2004/0074069 A1 | 4/2004 | Browne et al. | 24/442 |
| 2004/0074070 A1 | 4/2004 | Momoda et al. | 24/442 |
| 2004/0074071 A1 | 4/2004 | Golden et al. | 24/442 |
| 2004/0117955 A1 | 6/2004 | Barvosa-Carter et al. | 24/442 |

FOREIGN PATENT DOCUMENTS

| | | | |
|---|---|---|---|
| EP | 0385443 | | 9/1990 |
| EP | 0673709 | | 9/1995 |
| JP | 401162587 | | 6/1989 |
| JP | 4-314446 | * | 4/1992 |
| JP | 4-266970 | | 9/1992 |
| JP | 08260748 | | 10/1996 |
| WO | WO 99/42528 | | 8/1999 |
| WO | WO 00/62637 | | 10/2000 |
| WO | WO 01/84002 | | 2/2001 |
| WO | WO 02/45536 | | 6/2002 |

* cited by examiner

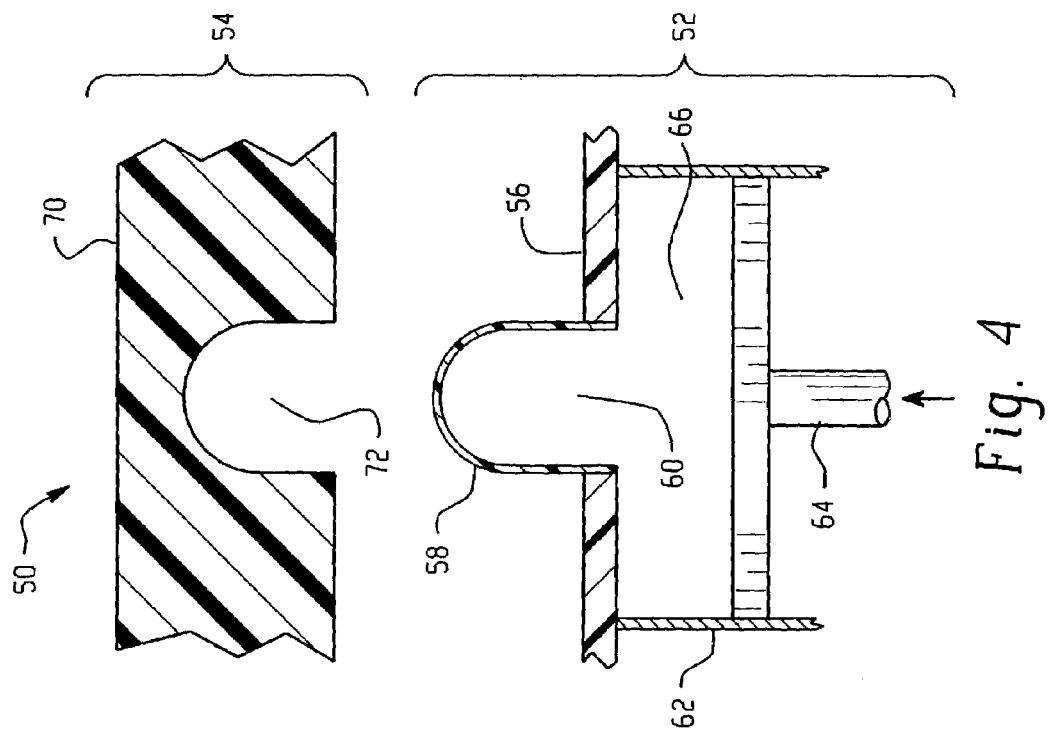
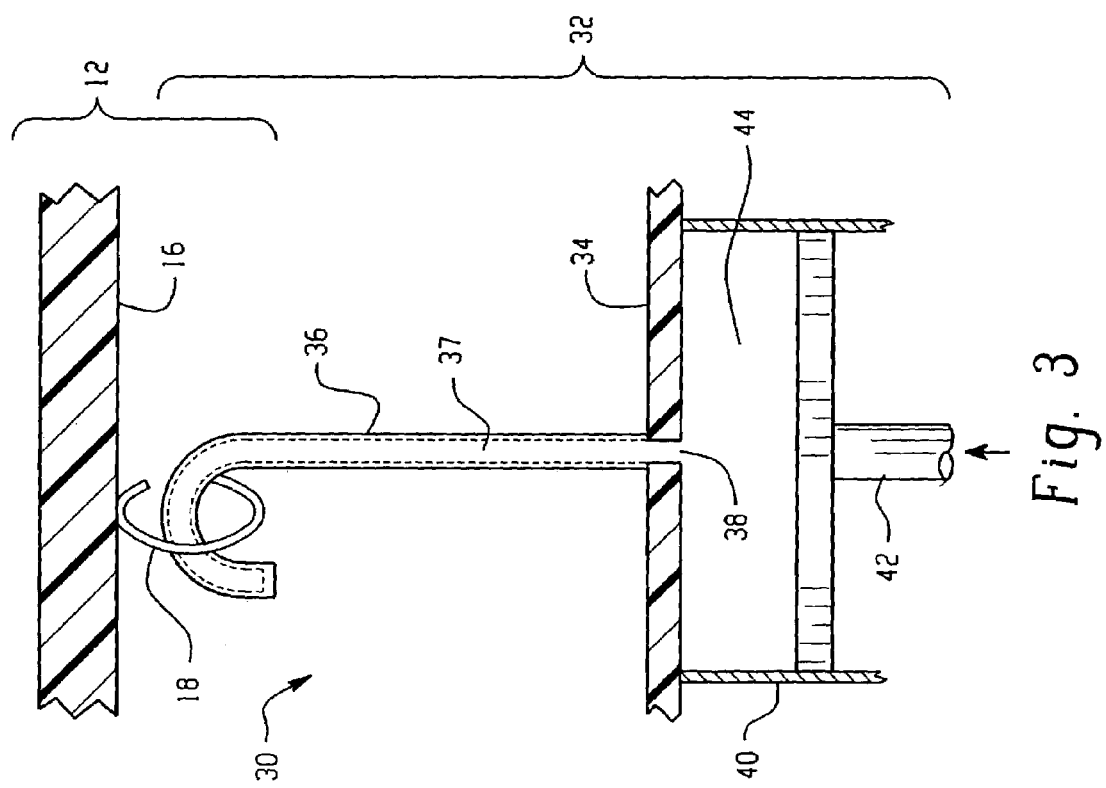

US 7,140,081 B2

RELEASABLE FASTENER SYSTEM

CROSS REFERENCE TO RELATED APPLICATIONS

This application is a continuation in part application and claims priority to U.S. patent application Ser. No. 10/273,691 filed Oct. 19, 2002 incorporated herein by reference in its entirety.

BACKGROUND

This disclosure relates to releasable attachment devices of the type used to fasten, retain, or latch together components of an apparatus or a structure that are to be separated or released under controlled conditions.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to move relative to each other in a direction perpendicular to their plane of contact.

BRIEF SUMMARY

Disclosed herein is a releasable fastener system that provides for a controlled release or separation of a joint in a shear and/or pull direction. The releasable fastener system comprises a loop portion comprising a loop support and a loop material attached or supported by the support; a hook portion comprising a support, at least one hook element attached to the support, wherein the at least one hook element comprises a hollow interior region in fluid communication with the at least one perforation; and means for increasing or decreasing a pressure within the hollow interior region upon receipt of an activation signal to provide the at least one hook element with a change in shape orientation, a change in flexural modulus property, or a combination of a change in the shape orientation and the flexural modulus property.

In another embodiment, a releasable fastener system comprises a loop portion comprising a loop support and a loop material attached or supported by the loop support; a hook portion comprising a support, at least one hook element attached to an upper surface of the support, a containment vessel coupled to a lower surface of the support, and at least one perforation through the support, wherein the at least one hook element comprises a hollow interior region in fluid communication with the at least one perforation, and wherein the containment vessel comprises a slidably engageable plunger; and an activation device in operative communication with the hook portion, the activation device being operable to selectively provide an activation signal to slidably engage the plunger within the containment vessel and cause a pressure change in the at least one hook element.

A process for operating a releasable fastener system comprises contacting a loop portion to a hook portion to form a releasable engagement, wherein the loop portion comprises a support and a loop material disposed on a surface thereon, and wherein a hook portion comprising a support, at least one hook element attached to the support, wherein the at least one hook element comprises a hollow interior region in fluid communication with at least one perforation and is adapted to change a shape orientation, a flexural modulus property, or a combination thereof, upon receipt of an activation signal; maintaining constant shear and pull forces in the releasable engagement without introducing the activation signal; selectively introducing the activation signal to the hook portion, wherein the activation signal is effective to change the shape orientation, the flexural modulus property, or the combination thereof to the plurality of hook elements; and reducing shear and/or pull forces in the releasable engagement.

A hook portion for a releasable fastener system comprises a support comprising an upper surface, a lower surface and at least one perforation through the support; at least one hook element attached to the upper surface of the support, wherein the at least one hook element comprises a hollow interior region in fluid communication with the at least one perforation; and a containment vessel coupled to the lower surface of the support, and wherein the containment vessel comprises a slidably engageable plunger.

The above described and other features are exemplified by the following figures and detailed description.

BRIEF DESCRIPTION OF THE DRAWINGS

Referring now to the figures, which are exemplary embodiments and wherein the like elements are numbered, alike:

FIG. 3 is a cross sectional view of a releasable fastener system in accordance with one embodiment;

FIG. 4 is a cross sectional view of a releasable fastener system in accordance with another embodiment.

DETAILED DESCRIPTION

Figure 1:
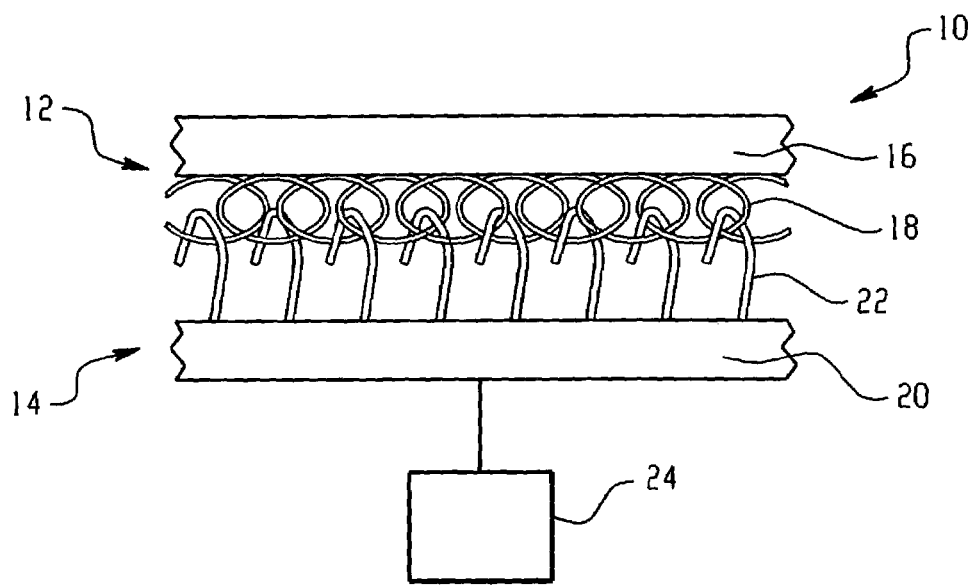
FIG. 1 is a cross sectional view of a releasable fastening system, wherein the releasable fastening system is engaged.

As shown in FIG. 1, a releasable fastener system, generally indicated as 10, depicts an engaged loop portion 12 and hook portion 14. The loop portion 12 comprises a support 16 and a loop material 18 disposed on one side thereof whereas the hook portion 14 comprises a support 20 and a plurality of closely spaced upstanding hook elements 22 extending from one side thereof. The hook elements 22 are formed of a material and have configurations that provide a shape changing capability and/or a change in flexural modulus properties as will be described in greater detail. The materials employed for fabricating the hook elements 22 are resilient and flexible providing shape changing capabilities and/or changes in the flexural modulus properties. Coupled to and in operative communication with the hook elements 22 is an activation device 24. The activation device 24, on demand, provides an activation signal to the hook elements 22 to change the shape orientation and/or flexural modulus of the hook element 22. The activation signal provided by activation device 24 for changing the shape orientation and/or flexural modulus of the hook elements 22 may include a pneumatic signal, a mechanical activation signal, a combination comprising at least one of the foregoing signals, or the like, the particular activation signal depending on the materials and/or configuration of the hook elements 22. The change in shape orientation and/or flexural modulus property generally remains for the duration of the applied activation signal. Upon discontinuation of the activation signal, the hook elements 22 revert substantially to a relaxed or unpowered shape. Of note, during engagement, no power (i.e., no activation signal) is required to initiate or maintain engagement. The illustrated releasable fastener system 10 is exemplary only and is not intended to be limited to any particular shape, size, configuration, number or shape of hook elements 22, shape of loop material 18, or the like.

During engagement, the two portions 12, 14 are pressed together to create a joint that is relatively strong in shear and pull directions, and weak in a peel direction. For example, when the two portions 12, 14 are pressed into face-to-face engagement, the hook elements 22 become engaged with the loop material 18 and the close spacing of the hook elements 22 resists substantial lateral movement when subjected to shearing forces in the plane of engagement. Similarly, when the engaged joint is subjected to a force perpendicular to this plane, (i.e., pull forces), the hook elements 22 resist substantial separation of the two portions 12, 14. However, when the hook elements 22 are subjected to a peeling force, the hook elements 22 can become disengaged from the loop material 18. It should be noted that separating the two portions 12, 14 using the peeling force generally requires that one or both of the supports forming the hook portion and loop portion be flexible.

Figure 2:
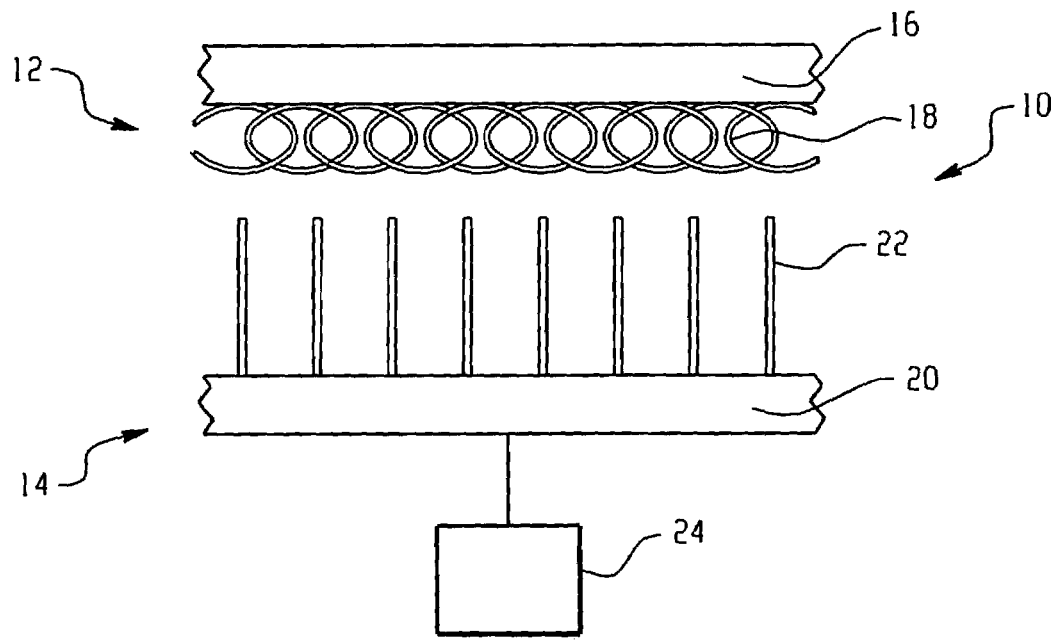
FIG. 2 is a cross sectional view of the releasable fastening system of FIG. 1, wherein the releasable fastening system is disengaged.

To reduce shear and pull forces resulting from the engagement, the shape orientation and/or flexural modulus of the hook elements 22 is altered upon receipt of the activation signal from the activation device 24 to provide a remote releasing mechanism of the engaged joint. As a result of changing the shape orientation and/or flexural modulus of the hook elements 22, a marked reduction in shear and pull forces is observed, thereby allowing the joint to separate in directions normally associated with pull and shear. That is, the change in shape orientation and/or flexural modulus reduces the shearing forces in the plane of engagement, and reduces the pull forces perpendicular to the plane of engagement. For example, the plurality of hook elements 22 can have inverted J-shaped orientations (as shown in FIG. 1) that are changed, upon demand, to substantially straightened shape orientations (as shown in FIG. 2) upon receiving an activation signal from the activation device 24. The substantially straightened shape relative to the J-shaped orientation provides the joint with marked reductions in shear and pull forces. Similarly, a reduction in shear and pull forces can be observed by changing the flexural modulus of the hook elements. The change in flexural modulus properties can be made individually, or in combination with the shape change orientation. For example, changing the flexural modulus properties of the hook elements to provide an increase in flexibility will reduce the shear and pull forces. Conversely, changing the flexural modulus properties of the hook elements to decrease flexibility (i.e., increase stiffness) can be used to increase the shear and pull forces when engaged. That is, the holding force is increased thereby providing a stronger joint.

The hook elements 22 may be formed integrally with support 20, or more preferably, may be attached to the support 20. In practice, spacing between adjacent hook elements 22 is an amount effective to provide sufficient shear and pull resistance desired for the particular application during engagement with the loop material 18. Depending on the desired application, the amounts of shear and pull force required for effective engagement can vary significantly. Generally, the closer the spacing and the greater amount of hook elements employed will result in increased shear and pull forces upon engagement.

Materials suitable for manufacturing the hook elements 22 include thermoplastics such as polypropylene, polyethylene, polyamide, polyester, polystyrene, polyvinyl chloride, acetal, acrylic, polycarbonate, polyphenylene oxide, polyurethane, polysulfone, and the like. Preferably, the material as well as the dimensions of the hook elements provides sufficient resiliency and/or flexibility to provide an effective change in shape orientation and/or flexural modulus property upon receipt of the activation signal from the activation device 24. Other suitable materials will be apparent to those skilled in the art in view of this disclosure.

The hook elements 22 preferably have a shape configured to become engaged with the loop material 18 upon pressing contact of the loop portion 12 with the hook portion 14, and vice versa. In this engaged mode, the hook elements 22 can have an inverted J-shaped orientation, a mushroom shape, a knob shape, a multi-tined anchor, T-shape, spirals, or any other mechanical form of a hook-like element used for separable hook and loop fasteners. Such elements are referred to herein as "hook-like", "hook-type", or "hook" elements whether or not they are in the shape of a hook. Likewise, the loop material may comprise a plurality of loops or pile, a shape complementary to the hook element (e.g., a key and lock type engagement), or any other mechanical form of a loop-like element used for separable hook and loop fasteners.

The loop material 18 generally comprises a random or ordered looped pattern or pile of a material. The loop material is often referred to as the "soft", the "fuzzy", the "pile", the "female", or the "carpet". Suitable loop materials are commercially available under the trademark VELCRO from the Velcro Industries B.V. Materials suitable for manufacturing the loop material include thermoplastics such as polypropylene, polyethylene, polyamide, polyester, polystyrene, polyvinyl chloride, acetal, acrylic, polycarbonate, polyphenylene oxide, polyurethane, polysulfone, and the like. The loop material 18 may be integrated with the support or may be attached to the support.

The supports 16 (loop portion 12) or 20 (hook portion 14) maybe rigid or flexible depending on the intended application. Suitable materials for fabricating the support include plastics, fabrics, metals, combinations comprising at least one of the foregoing materials, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like termoplastic polymers. An adhesive may be applied to the backside surface of the support (the surface free from the hook elements 22 or loop material) for application of the releasable fastener system to an apparatus or structure. Alternatively, the releasable fastener system 10 may be secured to an apparatus or structure by bolts, by welding, or any other mechanical securement means. It should be noted that, unlike traditional hook and loop fasteners, both supports 16, 20 could be fabricated from a rigid or inflexible material in view of the remote releasing capability provided. Traditional hook and loop fasteners typically require at least one support to be flexible so that a peeling force can be applied for separation of the hook and loop, fastener.

FIG. 3 schematically illustrates an exemplary pneumatically actuated releasable fastener system. The pneumatically actuated releasable fastener system, generally designated 30, comprises a hook portion 32 that includes a support 34 having at least one hook element 36. Each hook element 36 comprises a hollow interior region aligned with and in fluid communication with a perforation 38 in the support 34. In a relaxed or unpowered state, the hook elements 36 are preferably hook-like shaped and can become engaged with a loop portion 12. As previously discussed, the loop portion 12 comprises a support 16 and a loop material 18 attached or supported one side thereof. The hook elements 36 are preferably fabricated from resilient flexible materials to permit a change in shape orientation and/or flexural modulus property for the hook elements 36.

The system 30 further comprises a containment vessel 40 coupled to the support 34 in which a plunger 42 can be slidably engaged against the walls of the containment vessel 40. Inward movement of the plunger 42 causes pressurization of fluid within a reservoir 44 formed in the containment vessel 40, which subsequently causes pressurization of fluid within the hook element 36. The increase of pressure within the hook elements 36 can be utilized to cause a change in the shape orientation and/or flexural modulus. The activation device 24 (shown in FIG. 1) is coupled to the plunger 42 to provide selective pressurization of the hook elements 36. For example, the hook element 36, upon pressurization, can be configured to change its shape orientation from a hook-like shape to a substantially straightened shape, thereby disengaging the hook element 36 from the loop material 18. Alternatively, pressurization can be used to increase the rigidity or stiffness of the hook element without changing its generally hook-like shape, which causes an increase in the forces securing the hook portion 32 to the loop portion 12. Conversely, depressurizing the hook elements 36 causes a decrease in the rigidity, i.e., flexural modulus, thereby providing a reduction in shear, pull, and peel forces. In this manner, the shear, pull and peel forces can be manipulated and tailored to the particular application. Alternatively, the releasable fastener system may further include springs (94, as shown in FIG. 5), that are attached to the plunger 42 and the hook support 34 to provide or assist with the movement of the plunger 42.

FIG. 4 illustrates a releasable fastener system 50 in accordance with another embodiment. The releasable fastener system 50 includes a hook portion 52 and a loop portion 54. The hook portion 52 comprises a support 56 having a plurality of upright hook elements 58 and perforations 60. The hook elements 58 preferably comprise a hollow knob-like shape in fluid communication with perforation 60 in the support 56. A containment vessel 62 is coupled to the support 56 in which a plunger 64 can be slidably engaged against the walls of the containment vessel 62. Inward movement of the plunger 64 against the walls of the containment vessel 62 causes pressurization of fluid within a reservoir 66 formed in the containment vessel 62, which subsequently causes pressurization of fluid within the hook element 58. The loop portion 54 comprises a support 70 and a complementary opening/cavity 72 adapted for receiving the knob-like shape of the hook element 58 disposed in the support 70. To effect engagement, the hook element 58 is aligned with the complementary opening/cavity 72 of the loop support 54. Increasing pressure within the hook element 58 causes the hook element 58 to expand resulting in a frictional engagement and/or a mechanical interlock of hook element 58 within the complementary opening/cavity 72 of the loop portion 54. Decreasing the pressure within the hook element 58 reduces the forces associated with the frictional engagement and/or mechanical interlock to provide a reduction in the holding forces, thereby reducing the forces necessary to effect release of the loop portion from the hook portion.

Figure 5:
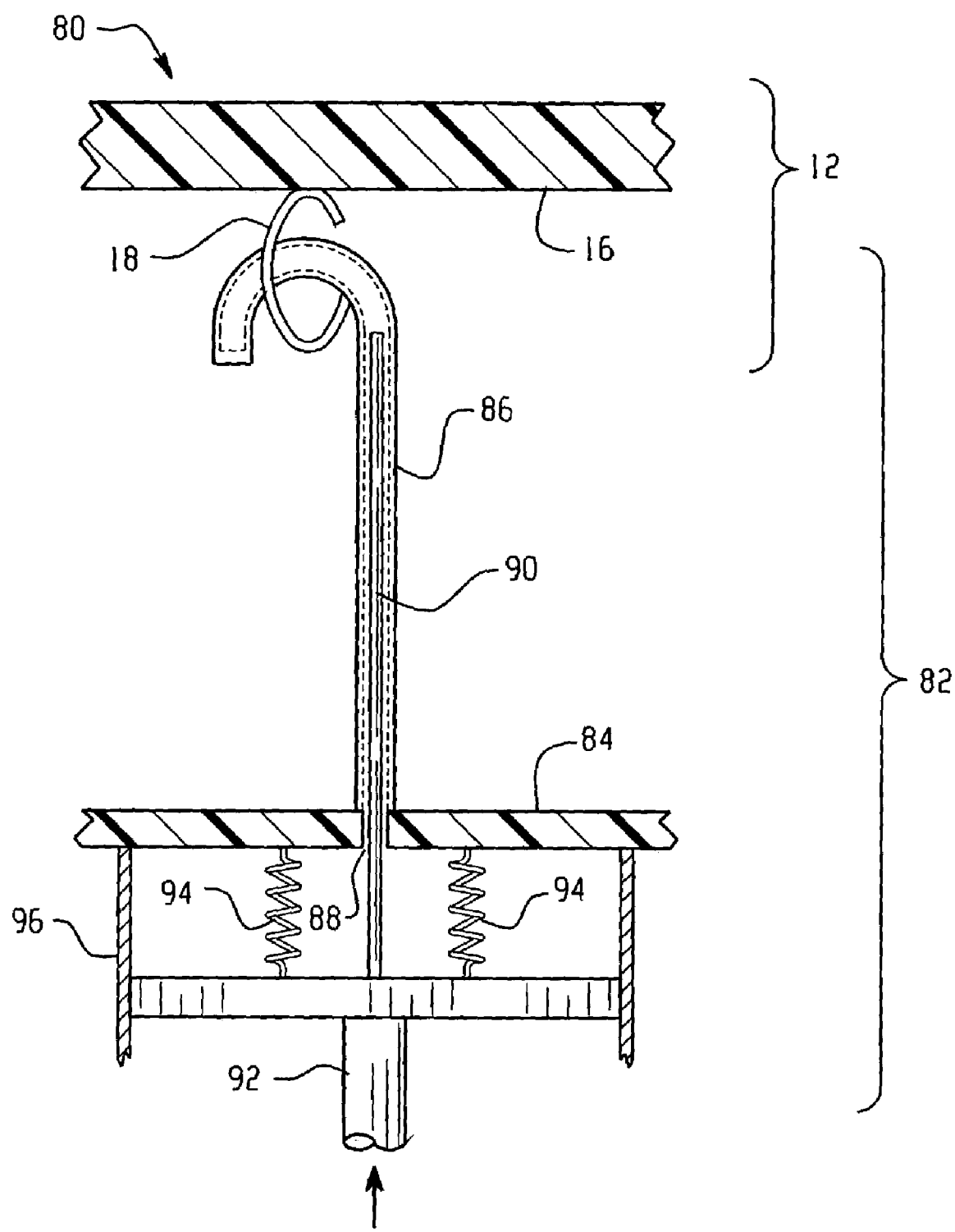
FIG. 5 is a cross sectional view of a releasable fastener system in accordance with yet another embodiment.

FIG. 5 illustrates a releasable fastener system generally designated 80 comprising loop portion 12 and a hook portion 82. The hook portion 82 comprises a support 84 having a plurality of upright hook elements 86 and perforations 88. Each hook element 86 comprises a hollow interior region aligned with and in fluid communication with the perforation 88 in the support 84. In this alternative embodiment, the hook elements 86 are reinforced in the longitudinal direction. Preferably, one or more small diameter rigid elements 90, e.g., rods, are inserted into the hollow region of the hook element 86, wherein one end of the rod 90 is coupled to a plunger 92, which is contained within containment vessel 96. The length of the rod 90 is dimensioned to allow the hook element 86 to have a hook-like shape as shown, preferably, in the relaxed and unpowered state. In other words, a distal end of the hook element 86 is free from the rod 90 when the hook element 86 has its hook-like shape.

Alternatively, the releasable fastener systems shown in FIGS. 3–5 may further include springs 94 (an example of which is shown in FIG. 5) which are coupled to the plunger 92 and the support 84. In the unactivated position, the springs 94 are preferably unloaded and thus extended. Upon movement of the plunger 92 toward the support 84 under an applied load, the springs are compressed and the rods 90 are pushed up into the curved tip portions (i.e., the hook-like shape) of the hook elements 86 causing a change in the shape orientation of the hook element, i.e., straightening the distal end of the hook elements. This straightening of the hook elements will provide a reduction in the pull, peel, and shear forces associated with the engagement, thereby permitting the hook portion to be readily separated from the loop portion. Release of the load applied to the plunger will cause the springs to expand to their unloaded geometry, which action will withdraw the rods from the tips of the hooks which in turn will result in the hooks assuming their original hook-shaped geometry.

The movement of the plunger 92 within the containment vessel 96 can be effected through numerous direct and remote means including, but not limited to, movement of a solenoid, flexing of a diaphragm, direct loading of the plunger such as by an operator's finger, fabricating the springs from a shape memory material effective to exert a load upon receipt of an activation signal, and the like. Alternatively, the diaphragm may be made of a shape memory material responsive to applied heat or the like for pressurizing and depressurizing the containment vessel and hook elements.

Advantageously, the releasable fastener systems described herein are extremely versatile and can be used in a variety of different applications. For example, the releasable fastener system can be employed to releasably attach two automotive structural elements together to provide a mechanism that delivers different load paths in the event of an impact sufficient to activate the release mechanism. Welded and adhesively bonded "rigid" joints provide fixed load paths. The use of the remote release mechanism can be used to alter the load path. Other examples include providing a mechanism for opening and closing apparatus such as trunks, doors, glove box, and the like. The releasable fastener system may also be employed for releasable on-demand attachment mechanisms such as for releasable attachment for batteries, fuels cells, cargo containers, vehicle interior and exterior components, and the like. Moreover, the releasable fastener systems can be configured such that an energy source is not required to maintain engagement of the joint. Energy, i.e., the activation signal, can be used to provide separation, thereby minimizing the impact on energy sources during use of the releasable fastener system.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A releasable fastener system comprising:
    a loop portion comprising a loop support and a loop material attached or supported by the support;
    a hook portion comprising a support, and at least one hook element attached to the support, wherein the at least one hook element comprises a hollow interior region in fluid communication with at least one perforation in the support; and
    means for increasing or decreasing a pressure within the hollow interior region upon receipt of an activation signal to provide the at least one hook element with a change in shape orientation, a change in flexural modulus property, oil combination of a change in the shape orientation and the flexural modulus property, wherein the at least one hook element is adapted to engage the loop material in the absence of the activation signal and disengage from the loop material in the presence of the activation signal, wherein the shape orientation to the at least one hook element changes from an inverted J-shaped orientation to a substantially straightened shape orientation upon pressurization.

2. The releasable fastener system of claim 1, wherein the activation signal comprises a pneumatic signal, a mechanically activating signal, or combinations comprising at least one of the foregoing signals.

3. The releasable fastener system of claim 1, wherein the at least one hook element comprises a shape comprising a J-shaped orientation, a mushroom shape, a knob shape, a multi-tined anchor shape, a T-shape, a spiral shape, or combinations comprising at least one of the foregoing shapes.

4. The releasable fastener system of claim 1, wherein the loop material comprises a shape adapted to be engaged with the hook elements when the hook portion is pressed into face-to-face engagement with the loop portion.

5. The releasable fastener system of claim 1, wherein the activation signal pneumatically or hydraulically introduces fluid into the hollow interior region of the at least one hook element.

6. The releasable fastener system of claim 1, wherein the at least one hook element comprises a hollow tube, wherein each hollow tube comprises an open end in fluid communication with the at least one perforation disposed in the support and a closed end, wherein the activation signal pneumatically or hydraulically introduces fluid through the at least one perforation and into the open end to change the shape orientation and/or flexural modulus property of the at least one of hook element.

7. The releasable fastener system of claim 1, wherein the at least one hook element comprises a knob like shape, and wherein the loop portion comprises at the least one complementary opening adapted to receive the knob like shape.

8. A releasable fastener system comprising:
    a loop portion comprising a loop support and a loop material attached or supported by the loop support;
    a hook portion comprising a support, at least one hook element attached to an upper surface of the support, a containment vessel coupled to a lower surface of the support, and at least one perforation through the support, wherein the at least one hook element comprises a hollow interior region in fluid communication with the a least one perforation, and wherein the containment vessel comprises a slidably engageable plunge; and
    an activation device in operative communication with the hook portion, the activation device being operable to selectively provide an activation signal to slidably engage the plunger within the containment vessel and cause a pressure change in the at least one hook element.

9. The releasable fastener system according to claim 8, further comprising a spring coupled to the plunger and the lower surface of the hook portion support.

10. The releasable fastener system according to claim 9, wherein the spring is fabricated from a shape memory material responsive to a thermal activation signal to slidably engage the plunger and cause the pressure change in the at least one hook element.

11. The releasable fastener system according to claim 8, further comprising a rigid element disposed in the hollow interior region of the at least one hook element, wherein the rigid element is dimensioned to provide a hook-like shape orientation to the at least one hook element in a relaxed state and a straightened shape orientation upon receipt of the activation signal.

12. The releasable fastener system according to claim 8, wherein the containment vessel comprises a diaphragm adapted to cause a pressure change in the at least one hook element upon receipt of the activation signal.

13. A process for operating a releasable fastener system, the process comprising:
    contacting a loop portion to a hook portion to form a releasable engagement, wherein the loop portion comprises a support and a loop material disposed on a surface thereon, and wherein a hook portion comprising a support, at least one hook element attached to the support, wherein the at least one hook element comprises a hollow interior region in fluid communication with at least one perforation in the support and is adapted to change a shape orientation, a flexural modulus property, or a combination thereof, upon receipt an activation signal;
    maintaining constant shear and pull forces in the releasable engagement without introducing the activation signal;
    selectively introducing the activation signal to the hook portion, wherein the activation signal is effective to change the shape orientation, the flexural modulus property, or the combination thereof to the at least one hook element and wherein the activation signal comprises sliding a rigid element into the hollow interior region of the at least one hook element; and reducing shear and/or pull forces in the releasable engagement.

14. The process according to claim 13, wherein the activation signal comprises pressurizing the at least one hook element.

15. The process according to claim 13, wherein the hook elements comprise a shape comprising a J-shaped orientation, a mushroom shape, a knob shape, a multi-tined anchor shape, a T-shape, a spiral shape, or combinations comprising at least one of the foregoing shapes.

16. A hook portion for a releasable fastener system comprising:
 a support comprising an upper surface, a lower surface and at least one perforation through the support;
 a plurality of hook elements attached to the upper surface of the support, wherein each one of the plurality of hook elements comprises a hollow interior region in fluid communication with the at least one perforation; and
 a containment vessel coupled to the lower surface of the support, and wherein the containment vessel comprises a slidable engageable plunger.

17. The hook portion according to claim 16, wherein the support comprises a metal, a plastic, a fabric, and a combination comprising at least one of the foregoing materials.

18. The hook portion according to claim 16, wherein the plurality of hook elements comprises a shape comprising a J-shaped orientation, a mushroom shape, a knob shape, a multi-tined anchor shape, a T-shape, a spiral shape, and combinations comprising at least one of the foregoing shapes.

19. The hook portion according to claim 16, further comprising an activation device adapted to provide an activation signal to the at least one hook element to slidably engage the plunger.

20. The hook portion according to claim 16, further comprising a rigid element disposed in the hollow interior region of each one of the plurality of hook elements, wherein the rigid element is dimensioned to provide a hook-like shape orientation to the plurality of hook elements in a relaxed state and a straightened shape orientation upon receipt of the activation signal.

21. The hook portion according to claim 16, wherein the containment vessel comprises a diaphragm.

* * * * *